United States Patent [19]
Brumm et al.

[11] 3,738,197
[45] June 12, 1973

[54] TRANSMISSION MODULATOR VALVE CONTROL

[75] Inventors: Karl Brumm, Russelsheim-Konigstadten; Jakob Moos, Oestrich; Rainer-Jorg Weber, Russelsheim; Helmut Drott, Wallerstadten; Bernd Stelzig, Russelsheim, all of Germany

[73] Assignee: General Motors Corporation, Detroit, Mich.

[22] Filed: Jan. 24, 1972

[21] Appl. No.: 220,291

[30] Foreign Application Priority Data
Mar. 17, 1971 Germany.................. P 21 12 804.1

[52] U.S. Cl. ............... 74/865, 74/861, 137/625.2, 137/625.22, 192/4 A
[51] Int. Cl... B60k 21/02, F16k 11/02, F16k 31/50
[58] Field of Search ..................... 74/859, 860, 866, 74/731, 645, 336, 339, 365, 752 A, 752 D, 861

[56] References Cited
UNITED STATES PATENTS
2,308,082  1/1943  Johnson............................ 74/865 X
2,680,381  6/1954  Maybach .............................. 74/865

*Primary Examiner*—Charles J. Myhre
*Assistant Examiner*—Thomas C. Perry
*Attorney*—W. E. Finken and A. M. Heiter

[57] ABSTRACT

A vacuum-control modulator arrangement for an automatic transmission of a motor vehicle, primarily for use in conjunction with a diesel or other fuel-injection engine, includes a vacuum generator arranged to be driven at a function of engine speed, to produce thereby a degree of vacuum which increases with increasing engine speed, and a proportioning valve which is responsive to accelerator pedal setting, or other control indicative of engine speed, to proportion the vacuum output from the vacuum generator so as thereby to produce a degree of vacuum which decreases with increasing engine speed.

The vacuum generator may simultaneously serve as the power source for a vacuum brake booster of the vehicle.

7 Claims, 10 Drawing Figures

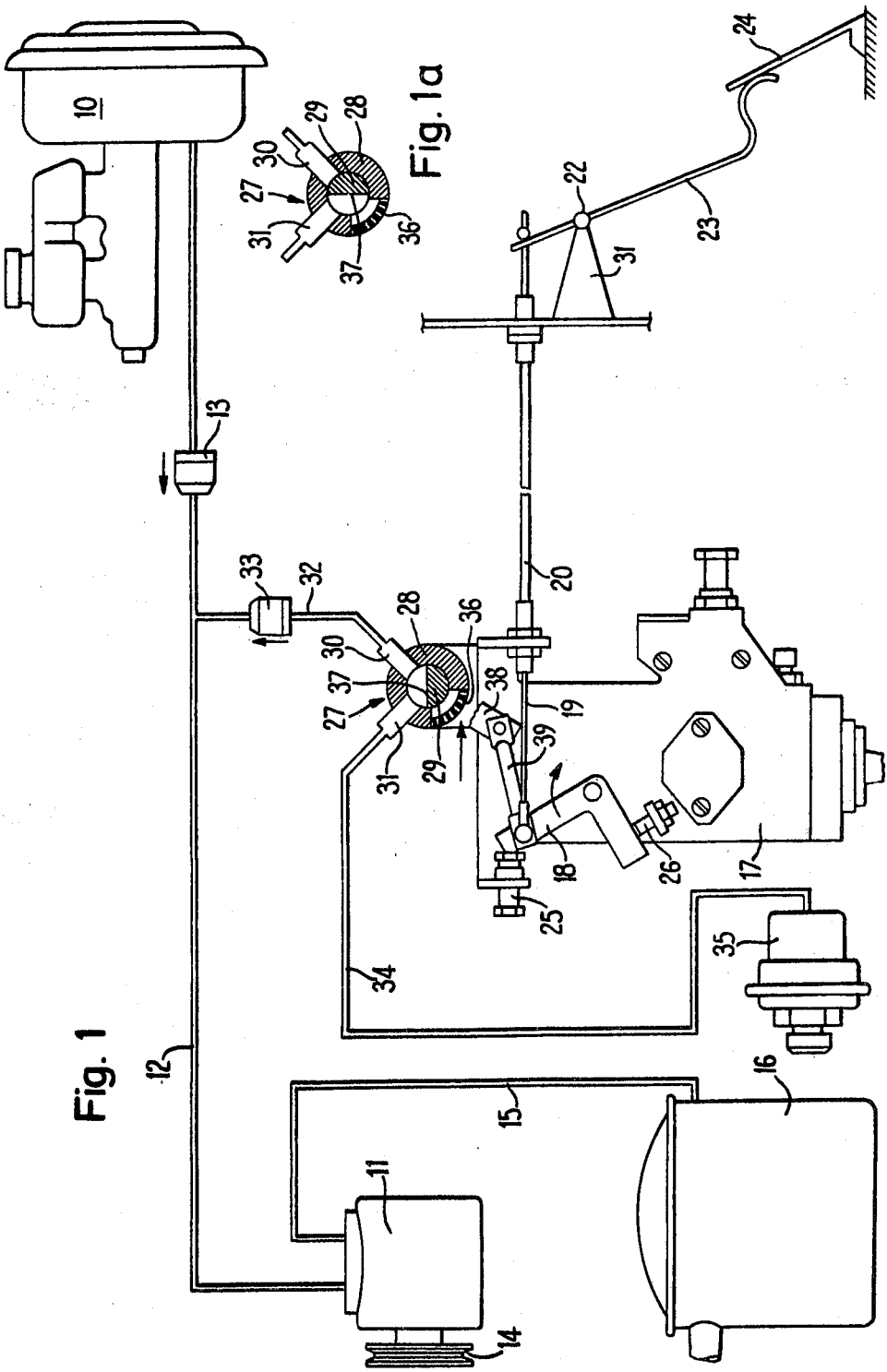

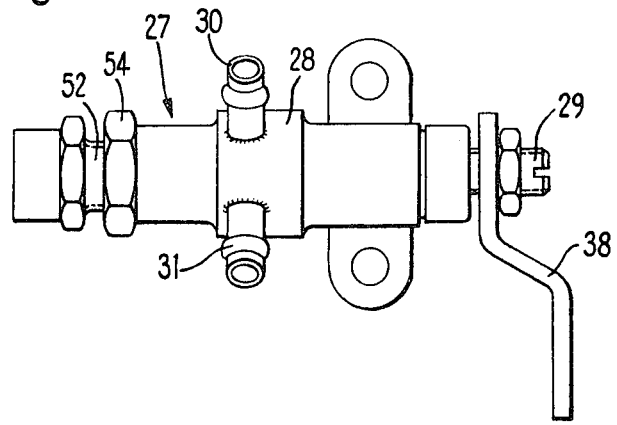
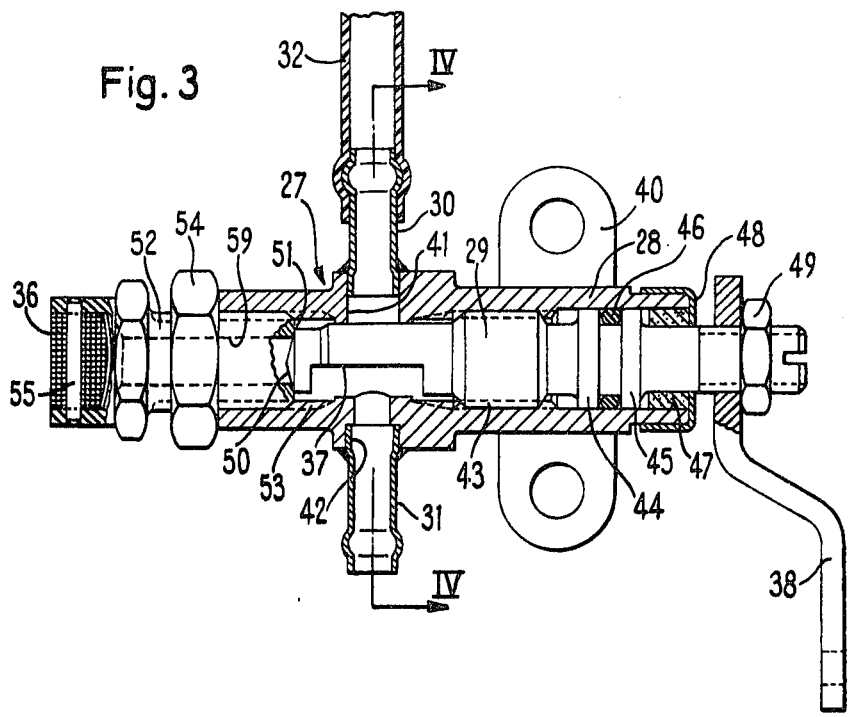

TRANSMISSION MODULATOR VALVE CONTROL

This invention relates to an arrangement for vacuum control of the modulator valve in automatic transmissions of motor vehicles, primarily such as are powered by diesel engines or other fuel-injection engines in which the fuel injection is brought about by a pressure-responsively controllable injection pump (distributor injection pump).

An automatic transmission, when used in a motor vehicle powered by an internal combusion engine, involves bringing the gearshift operations into harmony with the speed of the engine and with its torque; in other words, so arranging the shift mechanism that the correct gear-change actions take place at the correct moment. Usually the speed-responsive and load-responsive vacuum of the engine is utilized for controlling the gearshift. In the carburettor-type engine, the vacuum is taken off at the induction manifold and the vacuum line is connected to the vacuum chamber of the modulator. During idling, with the throttle closed and the accelerator pedal in the rest position, a high degree of vacuum prevails. With the accelerator pedal operated more and more, the throttle opens correspondingly, and when it is completely open the vacuum is practically nil. With the vehicle travelling, the vacuum in the low-pressure chamber of the modulator therefore influences the modulator valve, whilst the main pressure and the governor pressure likewise act on this valve in accordance with the engine speed. This determines the degree of modulator pressure which, in the main, controls the gear-change. Now if an injection-type engine, for example a diesel engine, is fitted instead of a carburettor-type engine, this source of engine vacuum is not available. If the diesel engine has a series injection pump, which in practice is regulated in a load-responsive fashion by means of a control rod, the motion of this rod could be used as a mechanical control for the modulator valve. However, when a distributor injection pump is employed, the control is effected by means of pressure, such that there are no moving parts which could offer this facility.

An object of the present invention is to provide vacuum control for the modulator valve even when — as is usually the case with injection engines — there is no throttle valve present and therefore also no vacuum source. In accordance with the invention this object is achieved by providing an engine-driven generator for producing the vacuum for controlling the modulator valve, whilst interposing a proportioning valve which tunes the engine-speed-responsive characteristic of the vacuum output supplied from the vacuum generator to the modulator valve.

The engine-driven vacuum generator has a characteristic which is the converse of the vacuum in the induction manifold of a carburettor-type engine, that is, at low engine speeds the degree of vacuum is small and it increases with increasing speed, whereas the modulator valve requires a characteristic corresponding to the vacuum in the induction manifold of a carburettor-type engine in which the highest degree of vacuum is achieved with the throttle closed, and accordingly the proportioning valve in conformity with the invention assumes the task of simulating, as it were, the characteristic of the vacuum in the induction manifold of the carburettor-type engine.

An important advantage attained by the invention is that even a motor vehicle powered by a diesel engine or by some other form of fuel-injection engine can now be fitted with a modulator-controlled automatic transmission.

The interposition of the proportioning valve in conformity with the invention makes it possible to use any engine-driven vacuum pump as a source of vacuum. Particularly advantageous is the use of a vacuum pump provided for a brake power booster of the vehicle to simultaneously serve to create the vacuum for supplying the proportioning valve.

Since the vacuum available at the modulator valve must be simulated in accordance with the engine speed, although with a reverse characteristic as compared with the vacuum pump, it is appropriate for the operation of the proportioning valve to be influenced directly or indirectly by the engine speed. Since the engine speed is in turn varied by the accelerator pedal, the invention proposes that the proportioning valve should be operable by the accelerator pedal or by a member associated with same.

In detail, the proportioning valve may be so designed and arranged that, in the closed condition, it keeps fully open the connection for the vacuum from the vacuum source to the modulator valve, and that conversely, with the proportioning valve fully open, no vacuum is available at the modulator valve. In order that the vacuum from the source will not be used up unnecessarily but, when not required by the modulator valve, will be available to an increased extent for other units, for example the brake power booster, the invention proposes, by way of an advantageous further development of the above concept, that during the opening action the proportioning valve will increasingly allow atmospheric air to reach the modulator valve, the connection to the vacuum source being closed to a like extent.

As regards the arrangement and actuation of the proportioning valve, a preferred configuration in accordance with the invention is one in which the valve is fixedly secured to the holder for the operating connections for the distributor injection pump, and is arranged to be actuated from the speed control lever. The result is that the effects of tolerances due to linkage clearances, Bowden cable dimensional differences and elasticity, and other tolerances also, can be eliminated. Further, it is possible to integrate the proportioning valve with the distributor injection pump: for example, the valve may be designed in such a way that it can be coupled to the spindle of a speed-adjusting lever.

As regards the detailed design of the proportioning valve used in conformity with the invention, basically no narrow limits are imposed. For example a spindle valve can be employed as a proportioning valve. However, a preferred form of proportioning valve is one in which a conical valve is coupled to a rotary valve element. With such an arrangement, the casing of the proportioning valve may have a connection for each of the lines leading to the modulator and to the vacuum source as well as for atmospheric air, with the vacuum connection and the modulator connection controlled by the rotary valve element, and the connection to atmosphere controlled by a threaded spindle.

To ensure the function as a valve on the one hand, and as a rotary valve element on the other hand, separate members may be utilized with an appropriate coupling mechanism between them. Alternatively, a convenient construction is one in which, at its end, the threaded spindle co-operates with some form of valve for controlling the atmospheric air, and at the same time is constructed as a rotary element beyond the valve seat. For this purpose, the spindle valve portion is appropriately designed as a conical valve. According to a further proposal in conformity with the invention, a simple and at the same time exact co-ordination of the opening and closing actions at the valve portion and at the rotary spool portion is achieved if the valve seat is made axially adjustable with respect to the spindle end forming the valve member. Preferably the valve seat is arranged in a sleeve-like adjusting screw which is provided with a continuous axial bore and can be axially screwed into the proportioning valve casing and secured in position by a lock nut. Advantageously, the outer end of the adjusting screw may serve to accommodate an interchangeable air cleaner, of steel wool for example.

In conformity with the invention, a rotary valve function of the threaded spindle may be realized in a manner which is particularly simple from a production aspect by ensuring that the two vacuum connections are arranged radially in a common plane on the cylindrical proportioning valve casing, and that the threaded spindle is flattened in the region of this plane so that, in a certain angular position of the threaded spindle, the two vacuum connections are placed in communication, and in another angular position they are made separate. In this respect it has been found particularly appropriate if the two vacuum connections are arranged substantially at right angles to one another and the threaded spindle has an approximately semi-circular cross-section in the region of its flattening. For operating the rotary spool from one extreme position to the other, rotation through 90° is necessary. An embodiment which ensures an adequate access of atmospheric air into the casing of the proportioning valve or towards the modulator when the rotary spool is in the cut-off position is characterized by such a dimensioning of the pitch of the threaded spindle that, when the vacuum connections are broken, the spindle is lifted so far from the valve seat by its rotary spool part that it releases a sufficient annular face at the valve part to give passage to the atmospheric air.

Another appropriate embodiment of the invention which above all permits an axially compact space-saving configuration of the proportioning valve is distinguished by the fact that the valve takes the form of a purely rotary element. Again with this embodiment, a spindle flattened off — approximately into semi-circular shape — in the region of two connections arranged in the proportioning valve casings, to serve as the rotary element. A useful feature of this embodiment is that, below the plane of the two connections (modulator connection and vacuum pump connection), a slot connecting the interior of the proportioning valve casing with the outer atmosphere can be machined in the said casing, the slot being likewise controllable by the flattened portion of the rotary spool. This saves a separate valve part for controlling the external atmospheric air, so that the proportioning valve can be made substantially shorter in the axial direction than in the case of the embodiment having a combined valve/rotary spool.

As regards the formation of the slot for the air from the exterior, it is proposed that the slot should be made shouldered, with a wider outer section and a narrower inner section and that both slot sections should each have a secant-shaped bounding face with respect to the proportioning valve casing, and additionally an air cleaner may be arranged in the wider outer section. The air cleaner can be secured in the slot by arranging that the slot is externally covered by a retaining plate which resiliently clamps round the proportioning valve and is provided with several apertures at the periphery for giving passage to the air.

The two connections are conveniently arranged at an angle of 135° to one another, with the modulator connection serving at the same time as a stop for the semi-circular flattened rotary spool part of the spindle when the spool is in its extreme position.

Advantageously this embodiment enables the modulator connection to serve at the same time as a stop for arresting the longitudinal movement of the spindle. A small tube may serve as a modulator connection and as a vacuum source connection respectively, the tubes being pressed into the casing of the proportioning valve.

The application of the proportioning valve for creating a vacuum appropriate to the requirements of the modulator is not restricted solely to vehicles having an injection-type engine. Even with carburettor-type engines, because of leakage losses (as in the air cleaner) and toxicity of exhaust gases, there are cases where the vacuum in front of the throttle valve and in the induction pipe cannot be utilized for controlling the automatic transmission. In such cases, the proportioning valve provides a means for controlling the gear change in the transmission, even in such carburettor-type engines. On account of the above-mentioned conditions, a correction of the induction manifold vacuum may become necessary in a accordance with the ignition timing also, and the proportioning valve in conformity with the invention is likewise applicable to this contingency.

In the drawings:

FIG. 1 is a general lay-out showing vacuum modulator control by means of a proportioning valve in conformity with the invention, as applied to an automatic transmission in a diesel-powered vehicle;

FIG. 1a is a fragmentary cross-sectional view of the proportioning valve shown in FIG. 1, but with a rotary spool spindle of the valve in the opposite end position;

FIG. 2 is an elevation of another embodiment of a proportioning valve in conformity with the invention;

FIG. 3 is a longitudinal section, to a somewhat enlarged scale, of the proportioning valve shown in FIG. 2;

FIG. 6 is an elevation of a proportioning valve in conformity with the invention, in an embodiment corresponding to FIGS. 1 and 1a.

Figure 4:
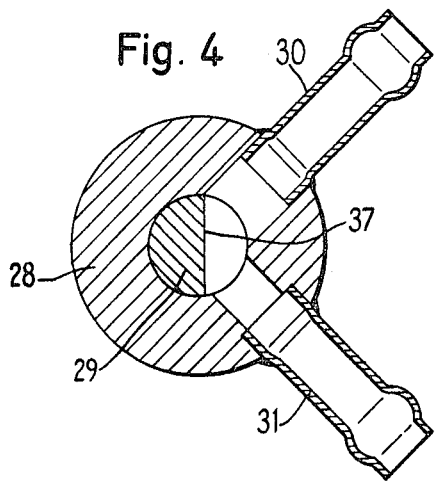
FIG. 4 is a cross-section of the proportioning valve along line IV—IV in FIG. 3, in the direction of the arrows.

In FIG. 1, a brake power booster of a diesel-driven motor vehicle is denoted by reference numeral 10. Vacuum for the brake power booster 10 is delivered by a vacuum generator in the form of a vacuum pump 11 which is connected for this purpose to the brake power booster 10 via a line 12 and a non-return valve 13. The vacuum pump 11 is driven from the motor vehicle engine (not shown), by way of a V-belt pulley 14. The intake side of the vacuum pump 11 is connected to an air cleaner 16 via a line 15. The supply of fuel to the combustion chambers of the cylinders is effected by a distributor injection pump 17, actuation of this distributor injection pump 17 being controlled by means of a bell-crank lever 18 engaged by a Bowden cable 19, 20 which is connected to an accelerator pedal 24 by way of a lever 23 articulated at pivot point 22 to the vehicle body 21. In the position shown in FIG. 1, the bell-crank lever 18 is just in its zero position (for engine idle), resting against stops 25.

A proportioning valve 27 is fixedly secured to the distributor injection pump 17, and consists of a casing 28 and a spindle 29 arranged therein. Two connections 30, 31 are arranged in the proportioning valve casing 28 approximately at right angles to one another. Connection 30 is in communication via a line 32 and a non-return valve 33 with the vacuum line 12 interconnecting the brake power booster and the vacuum pump 11, whereas connection 31 is joined via a line 34 to a vacuum modulator valve 35. The task of the vacuum modulator valve 35 is to control the gearshift actions in an automatic transmission (not shown) in accordance with the engine torque.

The proportioning valve casing 28 is also in communication with the atmosphere via an air cleaner filter 36. In the region of the sectional plane of FIGS. 1 and 1a, the spindle 29 of the valve 27 is flattened to a semi-circular shape, for functioning as a rotary valve element for controlling the amount of opening of the connection 30 and for controlling the access of atmospheric air from the exterior to the modulator connection 31. In the position of the spindle 29 shown in FIG. 1, the two connections 30 and 31 are in fluid communication and the connection to the outer air is blocked. The vacuum modulator 35 is therefore connected to the line 12 leading from the vacuum pump 11. In the position shown in FIG. 1a, on the other hand, communication between the two connections 30 and 31 is interrupted, and the atmospheric air has free access to the connection 31 and thereby to the vacuum modulator 35. The spindle positions shown in FIGS. 1 and 1a are the respective end positions. As will be explained in further detail below, the semi-circular shape of the rotary valve element at 37 and the right-angled arrangement of the two connections 30 and 31 permits intermediate setting of the spindle 29 providing communication between the two connections 30 and 31, and additionally providing a certain degree of access of atmospheric air from the exterior to the connection 31.

Actuation of the spindle 29, and therefore of the rotary valve part 37, is brought about by a lever 38 which is secured to the upper end of the spindle 29 (see also FIGS. 2 and 3) and is hingedly connected to the bell-crank lever 18 of the distributor injection pump 17. Actuation of the spindle 29 is therefore effected in response to the setting of the accelerator pedal 24, and as this latter influences the engine speed or the engine torque, actuation of the spindle 29 takes place directly in accordance with the prevailing engine speed or torque.

FIGS. 2 to 4 show an embodiment of a proportioning valve in which the valve casing 28 is of substantially cylindrical shape. A flange 40 serves to secure the proportioning valve 27 to the distributor injection pump 17. The two connections 30 and 31, which in FIG. 3 are shown rotated into the plane of the drawing, are inserted into respective radial bores 41 and 42 in the proportioning valve casing 28 and are connected to the latter. The spindle 29 is multi-stepped and has a screw thread 43 co-operating with a corresponding screw thread within the casing 28. To seal off the valve space from the exterior, a ring packing 46 is arranged between two lands 44 and 45 of the threaded spindle 29. At the right-hand end of the casing 28 as seen in FIG. 3, an oil-impregnated felt ring 47 embraces the threaded spindle 29 and is enclosed by a sheet-metal cover cap 48. At the extreme right-hand end of the threaded spindle 29, the actuating lever 38 is screwed on to the latter and is tightly secured to it by a lock nut 49.

At its extreme left-hand end, the threaded spindle 29 is formed with a conical surface forming a valve member 50 which co-operates with a sharp-edged valve seat 51. The valve seat 51 is a component part of an adjusting screw 52 which, by means of a thread 53, is screwed to the proportioning valve casing 28 and is secured by a lock-nut 54 against unwanted turning. The adjusting screw 52 permits axial displacement of the valve seat 51, so that even after assembly of the proportioning valve 27, control of the external air admission brought about by valve 50, 51 can still be accurately co-ordinated with the rotary valve spool control 37 of the two connections 30 and 31. At its extreme left-hand end, the adjusting screw 52 accommodates the air cleaner filter 36, which consists of steel wool and is secured by means of a cross-pin 55.

Figure 5:
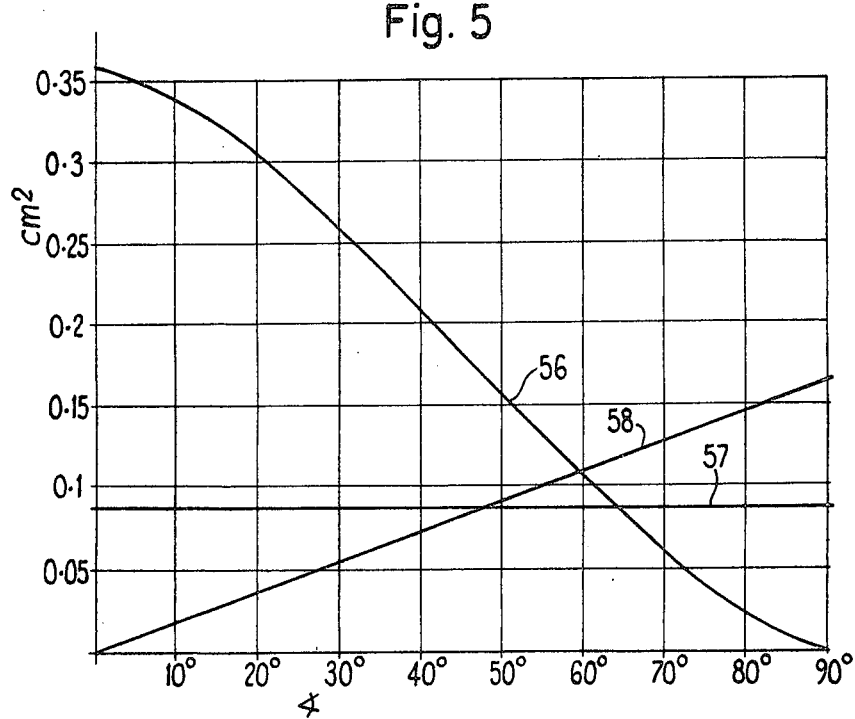
FIG. 5 is a graph which illustrates the dependence of the aperture cross-sections upon the rotation angle of the threaded spindle of the valve.

The correlation between the control action of the valve 50, 51 and the rotary valve control is illustrated in the graph shown in FIG. 5, in which the characteristic curves are recorded by plotting the free through-flow area against the angle of turning of the threaded spindle 29, this angle being reckoned from the end position (corresponding to a threaded spindle angle of zero) shown in FIGS. 1 and 4. The curve 56 represents the course of closing of the vacuum connection, and the characteristic 57 for the modulator connection 31 is a line running parallel to the abscissa over the entire range of rotation, indicating that the cross-section of the modulator connection does not change. The third line 58 illustrates the course of opening and closing of the valve 50, 51 and is a straight line of constant slope. The pitch of the thread 43 plays a part in these co-ordination considerations; the pitch must be so chosen as to lift the cone 50 from the seat 51 such that, at the prevailing angle of rotation (in the embodiment according to FIGS. 1 – 5 this is a maximum of about 90°), a sufficient annular area is released to provide access for the air from the exterior. The flattening 37 of the threaded spindle 29 in the region of the rotary spool is executed in such a way that, at the entry and exit of the connections 30, 31 for the vacuum, and with the sealing cone 50 closed, the connection from the vacuum pump 11 to the modulator vacuum chamber is fully open. During operation of the proportioning valve 27, rotation of the threaded spindle 29 causes the connection 30 to the vacuum pump to be closed progressively, so that the vacuum is not used up unnecessarily and reduction of the vacuum in the chamber of the modulator 35 is accelerated. At the same time however, during opening of the sealing cone 50, atmospheric air flows through bore 51 of the adjusting screw 52 and through the released annular gap to the modulator vacuum chamber. The result is that, depending on the aperture, i.e., the amount of depression of the accelerator pedal 24 (FIG. 1), the vacuum in the vacuum chamber is reduced to a greater or lesser extent.

The embodiment shown in FIGS. 6 – 9 is concerned with an axially compact space-saving configuration of proportioning valve 27a, similar to the valve indicated more schematically in FIGS. 1 and 2. In this embodiment, the control of the vacuum connections 30a, 31a and additionally the control of the external air supply are brought about by the flattened rotary part 37a of the spindle 29a. This construction avoids the need for a separate valve portion with valve member and seat, as compared with the above-described embodiment according to FIGS. 1 – 5. Rather, with the embodiment according to FIGS. 6 – 9, the external air passes through a radial offset slot 60, 61 into the interior of the proportioning valve 28a. The outer slot section 60 is made wider than the inner slot section 61, and serves to accommodate an air cleaner filter 62. Both slot sections 60, 61 are delimited from the casing material by secant-form faces 63, 64. The air cleaner 62 is prevented from falling out sideways by a retainer plate 65 which is resiliently clamped round the proportioning valve casing 28a. At its periphery, the retainer plate 65 is provided with several apertures (not shown in detail) giving passage to the air.

Figure 9:
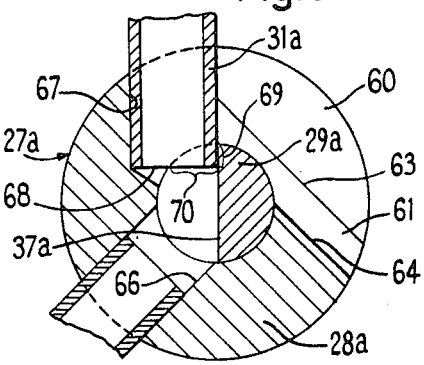
FIG. 9 is a section along line IX—IX of FIG. 6, in the direction of the arrows.

As will be seen particularly from FIG. 9, in this embodiment the two connections are arranged at an angle of 135° to one another. They each consist of a small tube which is press-fitted into a corresponding bore 66, 67. The tube 31a of the modulator connection extends into the casing 28a as far as a stop 68, such that the tube is therefore itself able to act as a stop for the rotary and axial movement of the threaded spindle, by the action of stop surfaces 69 and 70.

Figure 7:
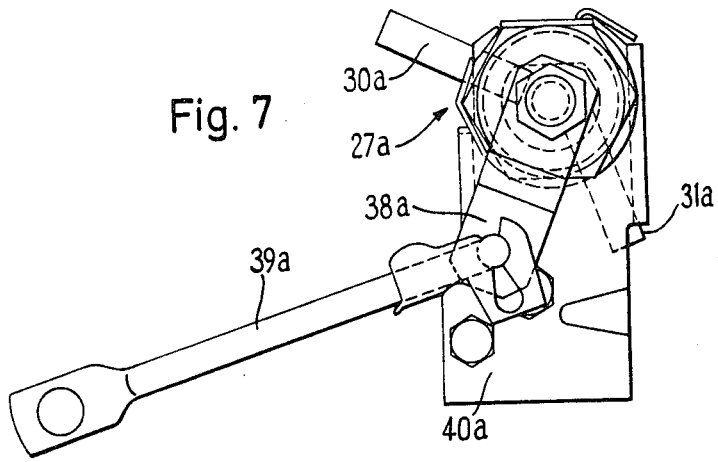
FIG. 7 is a plan of the proportioning valve shown in FIG. 6, looking in the direction of arrow VII.
Figure 6:
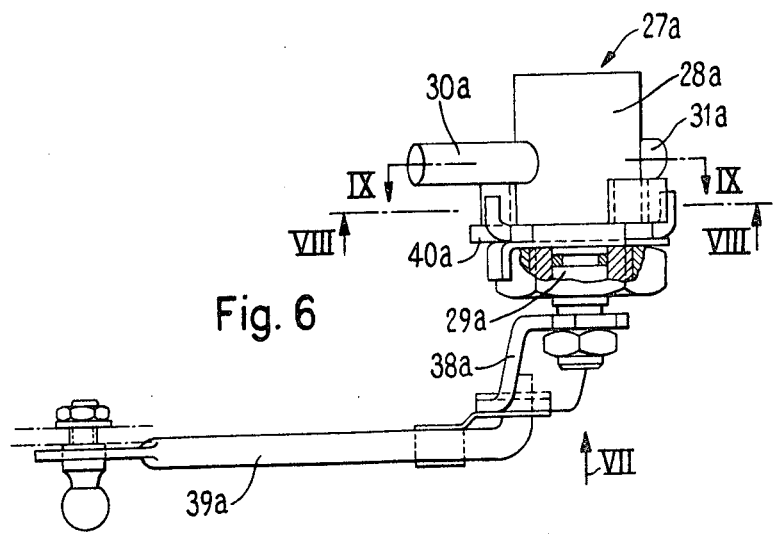
Figure 8:
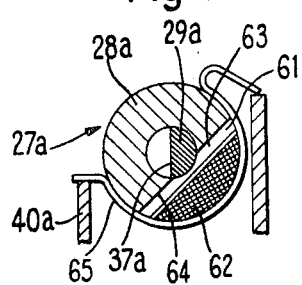
FIG. 8 is a section along line VIII—VIII of FIG. 6, in the direction of the arrows.

As will be seen from FIGS. 6 – 8, further elements include an actuator lever 38a for the spindle 29a, a connecting rod 39a to the bell-crank lever 18 (shown also in FIG. 1) of the distributor injection pump 17, and a flange 40a by means of which the proportioning valve 27a may be fixedly secured to the distributor injection pump.

We claim:

1. Vacuum-control modulator arrangement for an automatic transmission of a motor vehicle, comprising vacuum generator means,
   means for driving said vacuum generator means at a speed which is a function of the speed of the vehicle engine, to produce thereby a degree of vacuum which increases with increasing vehicle engine speed,
   vacuum modulator means for establishing a plurality of drive ratios in the automatic transmission in accordance with the output torque of the vehicle engine, a source of fluid pressure,
   proportioning means arranged to connect said vacuum modulator means selectively to said vacuum generator means and to said source of fluid pressure,
   and means for controlling said proportioning means in accordance with the speed of the vehicle engine, in an arrangement in which at low engine speeds the proportioning means closes off the connection from the source of fluid pressure and opens a full-flow connection from the vacuum generator means, and with increasing engine speeds the proportioning means progressively opens the connection from the source of fluid pressure and correspondingly closes off the connection from the vacuum generator means, for supplying to the vacuum modulator means a degree of vacuum which decreases in accordance with the increasing vehicle engine speed.

2. Vacuum-control modulator arrangement for an automatic transmission of a motor vehicle, comprising vacuum generator means,
   vacuum supply means,
   means for driving said vacuum generator means at a speed which is a function of the speed of the vehicle engine, to produce thereby in said vacuum supply means a degree of vacuum which increases with increasing vehicle engine speed,
   vacuum modulator means for controlling said automatic transmission,
   and proportioning means comprising a casing, a connection to said vacuum supply means, a connection to said vacuum modulator means, said connections extending radially through said casing in a common plane, an axially extending rotary valve spindle within said casing, a flat portion formed on said valve spindle in the region of said connections such that in one rotary position of said valve spindle the connections are in fluid communication whereas in another rotary position of said valve spindle fluid communication between the connections is blocked by the valve spindle, a screw-threaded connection between the valve spindle and the casing, a conical valve surface formed at one end of the valve spindle, an aperture in the casing forming a connection to atmosphere, a valve seat in the casing engageable by the conical valve surface of the valve spindle to provide controlled communication between atmosphere and the connection to said vacuum modulator means in dependence on the position of said valve spindle, and means responsive to vehicle engine speed for imparting rotary control movement to said valve spindle, for supplying thereby to said vacuum modulator means a degree of vacuum which decreases with increasing vehicle engine speed.

3. Vacuum-control modulator arrangement according to claim 2, in which the valve seat is made axially adjustable with respect to the conical valve surface of the valve spindle, in that the valve seat is arranged in a sleeve-like adjusting screw which is provided with a through axial bore and can be screwed axially relative to the casing of the proportioning means and fixed in its adjusted position by means of a lock nut.

4. Vacuum-control modulator arrangement for an automatic transmission of a motor vehicle, comprising vacuum generator means,
   vacuum supply means,
   means for driving said vacuum generator means at a speed which is a function of the speed of the vehicle engine, to produce thereby in said vacuum supply means a degree of vacuum which increases with increasing vehicle engine speed, vacuum modulator means for controlling said automatic transmission, and proportioning means comprising a casing, a connection to said vacuum supply means, a connection to said vacuum modulator means, said connections extending radially through said casing in a common plane, an axially extending rotary valve spindle within said casing, a flat portion formed on said valve spindle in the region of said connections such that in one rotary position of said valve spindle the connections are in fluid communication whereas in another rotary position of said valve spindle fluid communication between the connections is blocked by the valve spindle, a slot formed in said casing in the region of the flattened portion of said valve spindle and connecting the interior of the casing to atmosphere, the valve spindle cooperating with said slot to provide controlled communication between atmosphere and the connection to said vacuum modulator means in dependence on the position of said valve spindle, and means responsive to vehicle engine speed for imparting rotary control movement to said valve spindle, for supplying thereby to said vacuum modulator means a degree of vacuum which decreases with increasing vehicle engine speed.

5. Vacuum-control modulator arrangement for an automatic transmission of a motor vehicle, comprising a diesel engine, an automatic transmission driven by said diesel engine, vacuum modulator means for establishing a plurality of drive ratios in said automatic transmission, fuel injector pump means for said diesel engine, a movable control member for varying the delivery of said fuel injector pump means, an accelerator pedal, linkage means for varying the position of said movable control member in accordance with the position of said accelerator pedal, vacuum generator means, means for driving said vacuum generator means at a speed dependent on the speed of said diesel engine, to produce thereby a degree of vacuum which increases with increasing accelerator pedal setting and engine speed, proportioning means actuable to connect said vacuum modulator means selectively to said vacuum generator means and to atmosphere, and actuator means for actuating said proportioning means in accordance with the position of said movable control member, in an arrangement in which at a low accelerator pedal setting corresponding to a low engine speed the proportioning means closes off said connection to atmosphere and opens a connection between the vacuum generator means and the vacuum modulator means, and with increasing accelerator pedal setting corresponding to increasing engine speeds the proportioning means progressively opens the connection from the vacuum modulator means to atmosphere and correspondingly progressively closes off the connection between the vacuum generator means and the vacuum modulator means, for providing at the vacuum modulator means a degree of vacuum which decreases with increasing accelerator pedal setting and engine speed.

6. Vacuum-control modulator arrangement for an automatic transmission of a motor vehicle, comprising a diesel engine, an automatic transmission driven by said diesel engine, vacuum modulator means for establishing a plurality of drive ratios in said automatic transmission, fuel injector pump means for said diesel engine, a housing for said fuel injector pump means, a movable control member mounted on said housing and arranged to produce a control pressure for effecting variation of the delivery of said fuel injector pump means, an accelerator pedal, linkage means for varying the position of said movable control member in accordance with the position of said accelerator pedal, vacuum generator means, means for driving said vacuum generator means at a speed dependent on the speed of said diesel engine, to produce thereby a degree of vacuum which increases with increasing accelerator pedal setting and engine speed, proportioning means fixedly mounted on the housing of said fuel injector pump means and actuable to connect said vacuum modulator means selectively to said vacuum generator means and to atmosphere, movable actuator means for actuating said proportioning means, and linkage means interconnecting said movable actuator means and said movable control member to thereby vary the setting of said proportioning means in accordance with the position of said movable control member, in an arrangement in which at a low accelerator pedal setting corresponding to a low engine speed the proportioning means closes off said connection to atmosphere and opens a connection between the vacuum generator means and the vacuum modulator means, and with increasing accelerator pedal setting corresponding to increasing engine speeds the proportioning means progressively opens the connection from the vacuum modulator means to atmosphere and correspondingly progressively closes off the connection between the vacuum generator means and the vacuum modulator means, for providing at the vacuum modulator means a degree of vacuum which decreases with increasing accelerator pedal setting and engine speed.

7. Vacuum-control modulator arrangement for an automatic transmission of a motor vehicle, comprising vacuum generator means, vacuum supply means, means for driving said vacuum generator means at a speed which is a function of the speed of the vehicle engine, to produce thereby in said vacuum supply means a degree of vacuum which increases with increasing vehicle engine speed, brake power booster means, means connecting said brake power booster means at all times to said vacuum supply means, vacuum modulator means for establishing a plurality of drive ratios in the automatic transmission in accordance with the output torque of the vehicle engine, proportioning means arranged to connect said vacuum modulator means selectively to said vacuum supply means and to atmosphere, and means for controlling said proportioning means in accordance with the speed of the vehicle engine, in an arrangement in which at low engine speeds the proportioning means closes off the connection to atmosphere and opens a full-flow connection between the vacuum supply means, and the vacuum modulator means, and with increasing engine speeds the proportioning means progressively opens the connection from the vacuum modulator means to atmosphere and correspondingly closes off the connection from the vacuum modulator means, to the vacuum supply means, for supplying to the vacuum modulator means a degree of vacuum which decreases with the increasing vehicle engine speed.

\* \* \* \* \*